(12) United States Patent
Al-Onaizan et al.

(10) Patent No.: US 7,895,030 B2
(45) Date of Patent: Feb. 22, 2011

(54) VISUALIZATION METHOD FOR MACHINE TRANSLATION

(75) Inventors: Yaser Al-Onaizan, Elmsford, NY (US); Radu Florian, Danbury, CT (US); Abraham P. Ittycheriah, Brookfield, CT (US); Kishore A. Papineni, Carmel, NY (US); Jeffrey S. Sorensen, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 1012 days.

(21) Appl. No.: 11/687,015

(22) Filed: Mar. 16, 2007

(65) Prior Publication Data

US 2008/0228464 A1 Sep. 18, 2008

(51) Int. Cl.
G06F 17/28 (2006.01)
(52) U.S. Cl. ............... 704/2; 704/3; 704/4; 704/277
(58) Field of Classification Search .............. 704/2, 704/3
See application file for complete search history.

(56) References Cited

U.S. PATENT DOCUMENTS

| | | | | |
|---|---|---|---|---|
| 4,791,587 A | * | 12/1988 | Doi ........................... | 704/2 |
| 5,267,156 A | | 11/1993 | Nomiyama ............ | 364/419.02 |
| 5,477,450 A | | 12/1995 | Takeda et al. .......... | 364/419.02 |
| 5,510,981 A | * | 4/1996 | Berger et al. ................. | 704/2 |
| 5,535,119 A | * | 7/1996 | Ito et al. ....................... | 704/3 |
| 6,182,027 B1 | | 1/2001 | Nasukawa et al. ............ | 704/2 |
| 6,345,243 B1 | | 2/2002 | Clark ............................ | 704/2 |
| 6,876,963 B1 | | 4/2005 | Miyahira et al. ............... | 704/4 |
| 6,892,190 B2 | | 5/2005 | Hatori et al. ................. | 706/12 |
| 7,089,493 B2 | | 8/2006 | Hatori et al. ................ | 715/536 |
| 2001/0029443 A1 | | 10/2001 | Miyahira ....................... | 704/7 |
| 2002/0040292 A1 | | 4/2002 | Marcu .......................... | 704/4 |
| 2002/0138250 A1 | * | 9/2002 | Okura et al. ................... | 704/2 |
| 2004/0167768 A1 | * | 8/2004 | Travieso et al. ................ | 704/2 |
| 2005/0049851 A1 | | 3/2005 | Watanabe et al. .............. | 704/2 |
| 2005/0055217 A1 | | 3/2005 | Sumita et al. .............. | 704/277 |

OTHER PUBLICATIONS

Och, F.J., et al., "Statistical Machine Translation", 8 pgs.
Internet article, Google Web Search Features, www.google.com/intl/en/help/features.html, Sep. 14, 2006, 3 pgs.
Internet article, Google Translation of Snippets and Web Results, www.google.com/intl/en/help/faq_translation.html, Sep. 14, 2006, 2 pgs.

(Continued)

*Primary Examiner*—David R Hudspeth
*Assistant Examiner*—Justin W Rider
(74) *Attorney, Agent, or Firm*—Harrington & Smith (57) ABSTRACT

A method, computer program product and system are provided. The method includes the steps of: providing output text and a confidence value and displaying the output text. The output text includes text in a second language produced from machine translation performed on input text in a first language. The confidence value corresponds to an indication of reliability of the output text. The display of the output text includes a display attribute corresponding to the confidence value of the output text.

17 Claims, 5 Drawing Sheets

OTHER PUBLICATIONS

Internet article, Altavista Babel Fish Translation, world.altavista.com, Sep. 14, 2006, 1 pg.

Internet article, Altavista Bring Translation Capability to Your Site, www.altavista.com/help/free/free_searchbox_transml, Sep. 14, 2006, 2 pgs.

Internet article, Systran About Systran, www.systransoft.com/company/index.html, Sep. 14, 2006, 1 pg.

Internet article, Systranet Your Personal Internet Translator, www.systransoft.com/products/online_services/systranet.html, Sep. 14, 2006, 1 pg.

Internet article, Systranbox Looking for Ways to Add Value to Your Website?, www.systransoft.com/products/online_services/Systranbox.html, Sep. 14, 2006, 1 pg.

Internet article, Systranlinks Are You Missing Your Target Audience?, 2006, 4 pgs.

Internet article, IBM Software WebSphere Translation Server, http://www-306.ibm.com/software/pervasive/ws_translation_server, Sep. 18, 2006, 2 pgs.

Internet article, Xanadu Technology, www.foreignword.com/Technology/mt/mt.htm, Sep. 14, 2006, 4 pgs.

Internet article, Raphael Salkie, Using parallel corpora in translation, www.lang.ltsn.ac.uk/resources/goodpractice, Sep. 14, 2006, 4 pgs.

Internet article, IBM Research, Speech-to-Speech Translation Innovation Matters, http://domino.watson.ibm.com/comm/research.nsf/pp./r.uit.innovation.html, Oct. 19, 2006, 4 pgs.

* cited by examiner

VISUALIZATION METHOD FOR MACHINE TRANSLATION

GOVERNMENT RIGHTS

This invention was made with Government support under Contract No.: NBCH3039004 awarded by DARPA—Defense Advanced Research Projects Agency. The Government has certain rights in this invention.

TECHNICAL FIELD

The teachings in accordance with the exemplary embodiments of this invention relate generally to machine translation and, more specifically, relate to a visualization of the process and to an output of a machine translation system.

BACKGROUND

Machine translation refers to the automatic translation of text, using a computer system, for example, from one language ("a source language" or "a first language") into another language ("a target language" or "a second language"). The internet features numerous machine translation systems available for a variety of languages. Such machine translation applications or programs often allow a user to translate an HTML page (that is, a web page, often accessed from a website) from one language into another language. After translation, the page is rendered in the target language as previously specified by the user. Examples of current, free-to-use machine translation systems that can be employed in this manner include Google® Translation and Babel Fish Translation at AltaVista®, both of which are partially powered by SYSTRAN® Language Translation Technologies (specifically SYSTRANBox). Examples of other current, commercial machine translation systems that can be employed in this manner include IBM WebSphere® Translation Server, SYSTRANLinks and SYSTRANet®.

Figure 1:
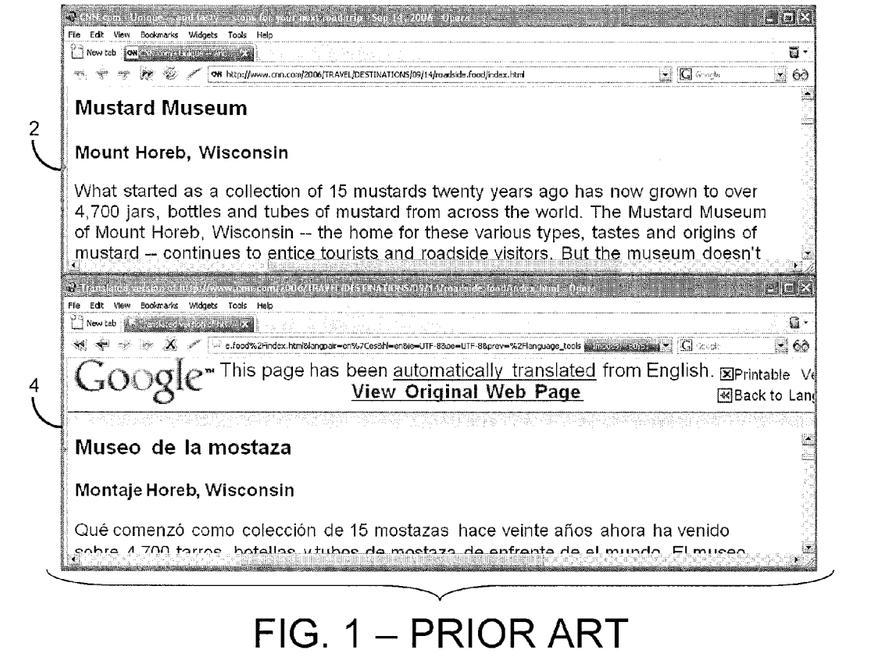
FIG. 1 shows a conventional example of on output of a machine translation system.

FIG. 1 shows a conventional example of an output of a machine translation system. In FIG. 1, two web browser windows are open 2, 4 showing the same web page, a CNN® page titled "Unique—and tasty—stops for your next road trip," in two different languages. The page is in English in the top browser window 2. Using Google® Translation, the text in the web page was translated from English into Spanish, with the results as shown in the bottom browser window 4. Other than the source language, target language and web page, no additional options or features are currently available with Google® Translation.

Machine translation technology usually falls into one of two major types. One type is rule-based, where an individual writes numerous rules, often numbering in the hundreds to thousands, to translate the source text from the source language into the target language. The quality of the resulting text depends on the robustness of the rules.

More recently, automatic methods have been used to induce rules or produce phrase libraries from parallel training corpora. Additional methods have been employed to compute the strength of the rules produced or the confidence in the translation method and tools (dictionaries, for example) employed. This type of machine translation is often referred to as statistical machine translation. Methods of generating the alignment between the source text and the result test and statistical methods of performing machine translation have been previously described in commonly-assigned U.S. Pat. No. 5,510,981 to Berger et al., "Language Translation Apparatus And Method Using Context-Based Translation Models." Methods of performing phrase-based translation have been widely published. See, e.g., Franz Josef Och and Hermann Ney. "Statistical Machine Translation". EAMT Workshop, pp. 39-46, Ljubljana, Slovenia, May 2000.

For each source phrase that consists of one or more source language words, a phrase library is consulted to obtain a set of target language sequences. Since different languages may have different word ordering patterns, a search is conducted over a window of source language positions to find the best translation. The process is repeated until the entire source sentence has been translated. Once the search is concluded, one can backtrack through the search hypotheses to find the best translation and alignment to the source language words.

Presently available machine translation systems generally have a limited user interface and/or are limited in the amount of information presented to a user.

SUMMARY

In an exemplary aspect of the invention, a method is provided. The method includes the steps of: providing output text and a confidence value and displaying the output text. The output text includes text in a second language produced from machine translation performed on input text in a first language. The confidence value corresponds to an indication of reliability of the output text. The display of the output text includes a display attribute corresponding to the confidence value of the output text.

In another exemplary aspect of the invention, a computer program product is provided. The computer program product includes program instructions embodied on a tangible computer-readable medium. Execution of the program instructions results in operations including: providing output text and a confidence value and displaying the output text. The output text includes text in a second language produced from machine translation performed on input text in a first language. The confidence value corresponds to an indication of reliability of the output text. The display of the output text includes a display attribute corresponding to the confidence value of the output text.

In a further exemplary aspect of the invention, a system is provided. The system includes a machine translation unit, a processing unit coupled to the machine translation unit and a display device coupled to the processing unit. The machine translation unit is operable to receive input text in a first language as an input, perform machine translation on the input text and produce output text in a second language and a confidence value as outputs. The confidence value corresponds to an indication of reliability of the output text. The processing unit is operable to receive the output text and the confidence value as inputs and produce display text to be displayed on the display device. The display text includes the output text. The display device is operable to display the display text. The display of the display text includes a display attribute corresponding to the confidence value of the output text.

In another exemplary aspect of the invention, a computer program product is provided. The computer program product includes program instructions embodied on a tangible computer-readable medium. Execution of the program instructions results in operations including: storing information, displaying input text and output text and indicating, using the stored information, in response to a user identifying one of the input text or the output text, the corresponding text in the other of the input text or the output text. The output text includes text in a second language produced from machine translation performed on the input text in a first language.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

When viewing the output of current machine translation systems, it is difficult to determine which words of the input text produced the corresponding output text or which words of the output text correspond to words of the input text. This may be even more problematic if the user is unfamiliar with either the source language or the target language. Furthermore, machine translation is less precise than translation performed by a person proficient in both languages. However, when viewing the output of current machine translation systems, a user is generally not presented with information relating to the confidence of the output text.

The foregoing and other disadvantages are overcome by the exemplary embodiments of the present invention. Described herein is a solution that will enable a user to view the correspondence between words or phrases of the output text and words or phrases of the input text and information relating to the confidence of the output text. By utilizing the information provided by the machine translation system, one can compute, and store, which words or phrases of the input text correspond to words or phrases of the output text (that is, the alignment of the output text with the input text). As a non-limiting example, by storing such information in a HTML page, a mouse-over event could highlight the corresponding word(s) in the other text, thus identifying the corresponding text in the other body. In performing the machine translation, one or more confidence values may be calculated representing the confidence in the translation of the output text. The confidence value may be shown by using a display attribute, where the display of the output text includes the display attribute. As a non-limiting example, the confidence value of one or more portions of text may be stored in a HTML page. Such stored information could be used to affect the display of the output text by using a display attribute (font color, for example) to indicate the confidence value.

As used herein, language refers to any set or system of formalized symbols as used in a more or less uniform fashion. Source text refers to a body of text as expressed in a source language. Input text refers to each individual portion of the source text that is separately entered into a machine translation system. Output text refers to each textual output of the machine translation system. That is, the output text refers to the input text after it has been translated from the source language into the target language by the machine translation system. Result text refers to the sum total of the output texts. For example, if the entirety of the source text, by means of individual input texts which each comprise a portion of the source text, is entered in the machine translation system, barring errors or other unforeseen complications, the result text will correspond to the source text as translated from the source language into the target language by the machine translation system. Confidence or a confidence value refers to an indication of the reliability of (that is, the confidence in) the output text. As non-limiting examples, confidence may be a parameter expressed in numerical terms or in other relative terms or attributes. The confidence value may comprise a probability or estimate relating to the accuracy of the output text.

For convenience, source language may also be referred to as the first language and target language may also be referred to as the second language, such that a machine translation system produces output text by translating input text from the first language into the second language.

Figure 2:
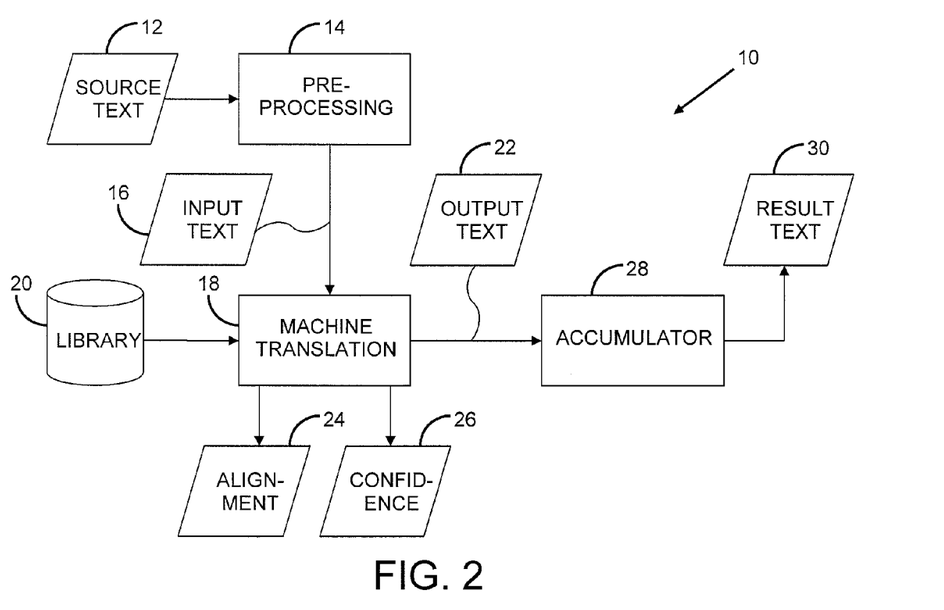
FIG. 2 depicts a simplified block diagram of an exemplary machine translation system that may be employed in conjunction with exemplary embodiments of the invention.

FIG. 2 depicts a simplified block diagram of an exemplary machine translation system 10 that may be employed in conjunction with exemplary embodiments of the invention. For the purposes of the exemplary system 10 depicted in FIG. 2, assume that a user has already specified a source language and a target language and that the system 10 is capable of translating text from the source language into the target language. Furthermore, assume that the source text 12 is text in the source language.

In the exemplary system 10 of FIG. 2, a source text 12 is input to a pre-processing stage 14. The pre-processing stage 14 segments the source text 12 into a series of input texts. For this example, each input text 16 may comprise a word, phrase or sentence of the source text 12. Each input text 16 is input to the machine translation stage 18. The machine translation stage 18, using a library of words and phrases 20 and one or more algorithms (not shown), performs machine translation on the input text 16 by searching the library 20 for the best translation of the input text 16. That is, the machine translation stage 18 uses the library 20 to translate the input text 16 from the source language into the target language. The library 20 comprises a collection of words and/or phrases in the source language with the corresponding translation of the words and/or phrases in the target language.

The machine translation stage 18 has three outputs: the output text 22, the alignment 24 and the confidence 26. The output text 22 is a translation of the input text 16 in the target language. The alignment 24 indicates the correspondence between the output text 22 and the input text 16. The confidence 26 comprises a confidence value indicative of the reliability of the output text 22. The output text 22 is input to an accumulator 28 which gathers all of the output texts and combines the output texts together to form the result text 30.

If the formatting (the appearance or paragraph structure, for example) of the source text 12 is preserved by the system 10, additional formatting information concerning the source text 12 may be gathered by the pre-processing stage 14 and, via the same or a different connection, be sent to the accumulator 28. Using the formatting information, the accumulator 28 combines the output texts together to form the result text 30 such that the formatting of the result text 30 is similar to the formatting of the source text 12.

As noted above, the pre-processing stage 14 segments the source text 12 into a series of input texts that each comprise a word, phrase or sentence of the source text 12. To accomplish this, the pre-processing stage 14 utilizes one or more algorithms (not shown) to analyze the source text 12 and intelligently segment the source text 12. The goal of this segmentation is to break down the source text 12 into discreet pieces (that is, input texts) such that each piece may be translated by the machine translation stage 18 using the library 20. That is, ideally each input text should have a corresponding translation that can be found by the machine translation stage 18 in the library 20. As may be expected, not every such input text may have a translation. For example, the proper name of a person or place (John Doe or Kansas, for example) may not have a translation to be found in the target language. As an additional non-limiting example, if the input text initially comprises a phrase (such a phrase itself comprising a plurality of words), there may not exist a translation of the entire phrase in the library 20. In such a case, the phrase may have to be further segmented such that suitable translations may be found. Even if additional segmentation is undertaken, there may be instances where a translation for the phrase remains unavailable. This process of additional segmentation is not depicted in the exemplary system 10 of FIG. 2. Furthermore, the input text 16 may have to be considered in the context of other input texts to accurately translate the respective portion of the source text. This additional contextual consideration is also not depicted in the exemplary system 10 of FIG. 2.

The pre-processing stage 14 may also perform additional processing on the source text 12 to obtain suitable input text 16 for the machine translation stage 18. As a non-limiting example, the source text 12 may be Romanized by converting the source text 12 from source characters in the source language (e.g. Arabic or Japanese characters) into input characters in the Latin alphabet. In such a manner, the machine translation stage 14 may be designed to only receive input text 16 containing characters in the Latin alphabet. As an additional non-limiting example, Chinese characters may be converted to pinyin which renders the words and/or phrases in the Latin alphabet. The converted pinyin text may be utilized as input text 16 for the machine translation stage 18.

The accumulator 28 is an optional component and may not be present in all exemplary embodiments of the invention. In alternative embodiments of the exemplary system 10 of FIG. 2, more than one library may be utilized by the machine translation stage 18. In further embodiments, one or more of such libraries may comprise translations specified by a user of the system 10. In other embodiments, two or more of the three outputs 22, 24, 26 of the machine translation stage 18 may be output together in one item of information, such a data file, as a non-limiting example. In further embodiments, instead of having three outputs 22, 24, 26, the machine translation stage 18 may only have two of the three outputs identified, so long as one of the outputs is the output text 22. That is, the machine translation stage 18 may have as outputs the output text 22 and either the alignment 24 or the confidence 26.

Should the machine translation stage 18 not be able to locate a translation for the input text 16, the system 10 may indicate such a failure. In other embodiments, the system 10 may further provide additional information concerning the failure to translate including: the input text 16, the source text 12 and the most likely translation(s) for the source text 12, as non-limiting examples.

It should be noted that the various blocks of the diagram of FIG. 2 may represent program steps, or interconnected logic circuits, blocks and functions, or a combination of program steps and logic circuits, blocks and functions for performing the specified tasks.

Figure 3:
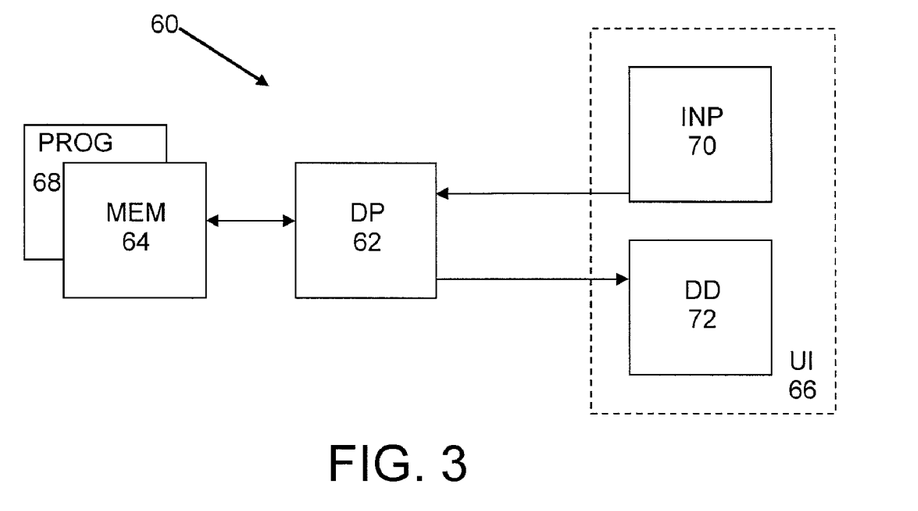
FIG. 3 illustrates a simplified block diagram of an electronic device that is suitable for use in practicing the exemplary embodiments of this invention.

FIG. 3 illustrates a simplified block diagram of an electronic device 60 that is suitable for use in practicing the exemplary embodiments of this invention. The electronic device 60 comprises a data processor (DP) 62 coupled to a memory (MEM) 64 and a user interface (UI) 66. The MEM 64 stores a set of program instructions (PROG) 68 that, when executed by the DP 62, enable the electronic device to operate in accordance with the exemplary embodiments of this invention, as discussed below in greater detail. The UI 66 comprises an input device (INP) 70 and a display device (DD) 72. The INP 70 enables a user to interact with the electronic device, if and when appropriate according to the exemplary embodiments of the invention. The DD 72 displays appropriate information for a user. In some embodiments, the INP 70 may be an optional component. Those of ordinary skill in the art will appreciate that an electronic device suitable for use in practicing the exemplary embodiments of this invention may comprise more than one data processor, more than one memory, more than one set of program instructions, more than one input device and/or more than one display device. Furthermore, those of ordinary skill in the art will appreciate that all of the components shown in FIG. 3 need not be located within a single electronic device. As a non-limiting example, the display device may comprise a separate electronic component coupled to the data processor.

With regards to FIG. 3, the exemplary embodiments of this invention may be carried out by computer software implemented by the DP 62 or by hardware, or by a combination of hardware and software. As a non-limiting example, the exemplary embodiments of this invention may be implemented by one or more integrated circuits. The MEM 64 may be of any type appropriate to the technical environment and may be implemented using any appropriate data storage technology, such as optical memory devices, magnetic memory devices, semiconductor-based memory devices, fixed memory and removable memory, as non-limiting examples. The DP 62 may be of any type appropriate to the technical environment, and may encompass one or more of microprocessors, general purpose computers, special purpose computers and processors based on a multi-core architecture, as non-limiting examples.

Figure 4:
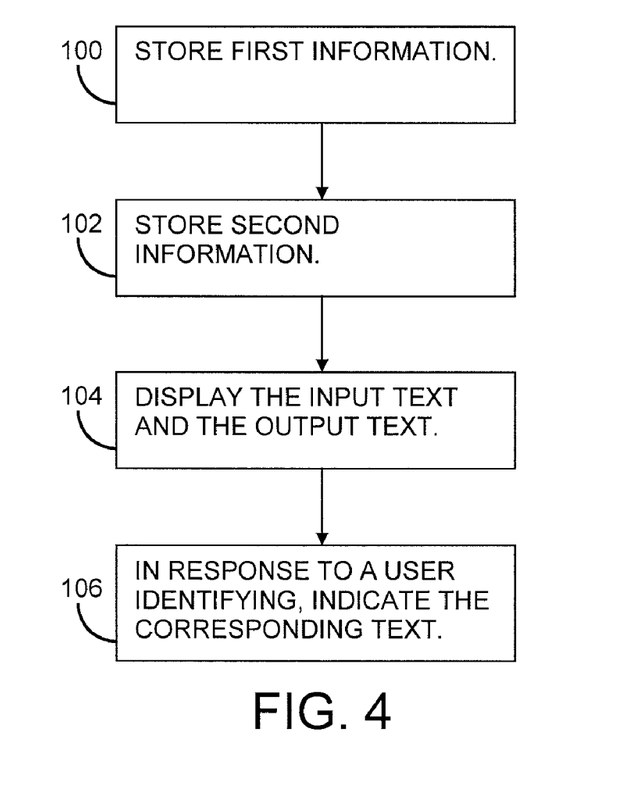
FIG. 4 depicts a flowchart illustrating one non-limiting example of a method for practicing the exemplary embodiments of this invention.

FIG. 4 depicts a flowchart illustrating one non-limiting example of a method for practicing the exemplary embodiments of this invention. In box 100, first information is stored. The first information comprises an alignment of output text with input text. The input text comprises text in a first language and the output text comprises text in a second language produced from machine translation performed on the input text. In box 102, second information is stored. The second information comprises a confidence value corresponding to an indication of reliability of the output text. In box 104, the input text and the output text are displayed. The display of the output text comprises a display attribute corresponding to the stored second information. In box 106, using the stored first information, in response to a user identifying one of the input text or the output text, the corresponding text in the other of the input text or the output text is indicated.

In other embodiments, steps 100 and 106 may be performed separately from steps 102 and 104. In further embodiments, steps 100 and 106 may be performed without steps 102 and 104. See FIG. 6. In other embodiments, steps 102 and 104 may be performed without steps 100 and 106. See FIG. 5. In such embodiments where only steps 102 and 104 are performed, instead of storing second information comprising a confidence value, output text and a corresponding confidence value may be provided. Furthermore, in such embodiments, only the output text need be displayed. That is, the input text may or may not be displayed in conjunction with displaying the output text.

Figure 5:
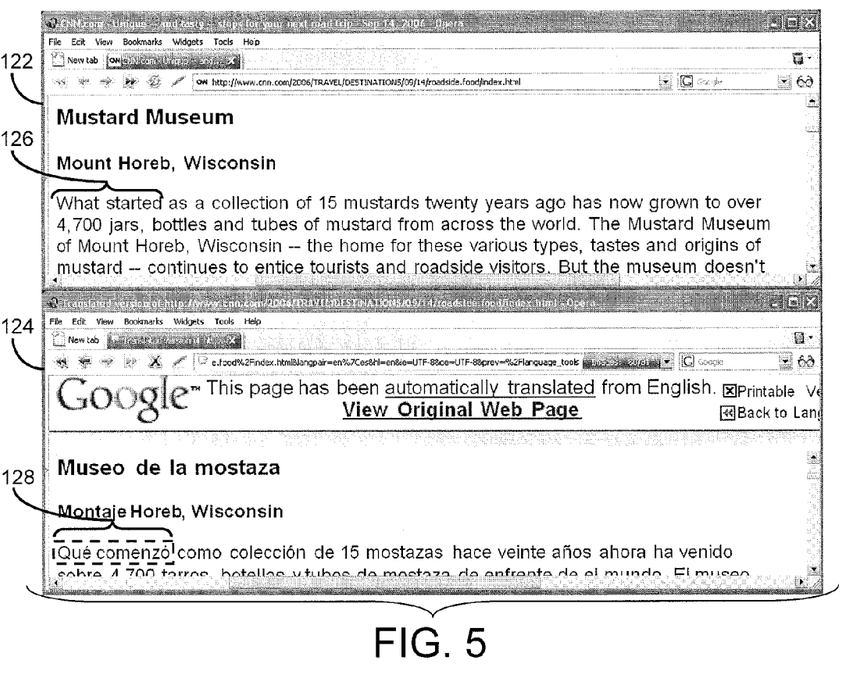
FIG. 5 shows an exemplary embodiment of the invention incorporating steps 102 and 104 of the method depicted in FIG. 4.

FIG. 5 shows an exemplary embodiment of the invention incorporating steps 102 and 104 of the method depicted in FIG. 4. In FIG. 5, two web browser windows are open 122, 124 showing the same web page, a CNN® page titled "Unique—and tasty—stops for your next road trip," in two different languages. The page is in English in the top browser window 122. Using machine translation, the text in the web page was translated from English into Spanish, with the results as shown in the bottom browser window 124. Note that for the exemplary embodiment shown in FIG. 5, and as further explained immediately below, although the source text (and thus input texts) is shown, only the output text need be displayed. Furthermore, for illustrative purposes, assume that the output text and a confidence value of the output text have been provided with the output text comprising text in a second language (Spanish) produced from machine translation performed on the input text in a first language (English) and the confidence value corresponds to an indication of reliability of the output text.

In the exemplary embodiment shown in FIG. 5, the phrase "What started" 126 has been translated into "Qué comenzó" 128. "What started" 126 corresponds to the input text. "Qué comenzó" 128 corresponds to the output text. The text of the top browser window 122 corresponds to the source text. The text of the bottom window 124 corresponds to the result text. While "What started" 126 is herein designated the input text and "Qué comenzó" 128 is designated the output text, other input texts and output texts of the example text provided may be utilized in conjunction with the exemplary embodiments of this invention. As a non-limiting example, "What" may be used as an input text with "Qué" being an output text. The potential for utilizing other input texts and output texts holds true for all of the examples shown in FIGS. 5-8.

In the exemplary embodiment of FIG. 5, assume that the output text 128 has been assigned a confidence value of 1.0. Furthermore, assume that a confidence value of 1.0 is indicated by a dashed box. As is apparent, the display of the output text 128 includes a display attribute, here a dashed box surrounding the output text 128 where the dashed box corresponds to the confidence value (1.0) of the output text. In such a manner, the confidence value of an output text may be visually represented by a specific display attribute. The display attribute comprises any visual attribute of or connected to the display of the output text. As non-limiting examples, the display attribute may comprise one or more of the following: a box around the output text, underlining, double underlining, bold, italics, font, font size, font color, background color, highlighting, strikethrough, small caps, all capital letters, blinking and other animation. In other embodiments, the confidence values for more than one output text may be indicated, by one or more display attributes, in the displayed output texts.

Figure 6:
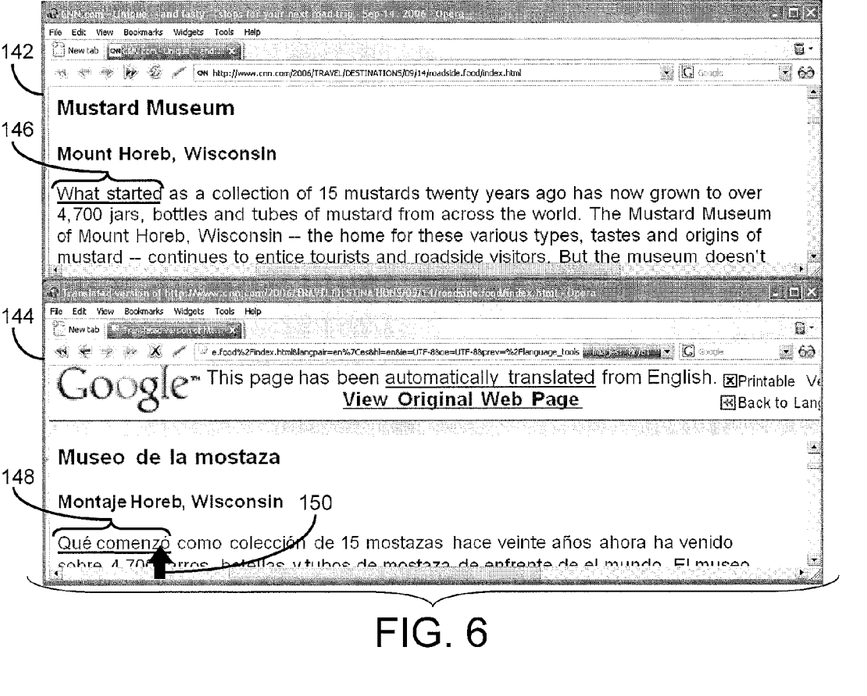
FIG. 6 shows another exemplary embodiment of the invention incorporating steps 100 and 106 of the method depicted in FIG. 4.

FIG. 6 shows another exemplary embodiment of the invention incorporating steps 100 and 106 of the method depicted in FIG. 4. In FIG. 6, two web browser windows are open 142, 144 showing the same web page, a CNN® page titled "Unique—and tasty—stops for your next road trip," in two different languages. The page is in English in the top browser window 142. Using machine translation, the text in the web page was translated from English into Spanish, with the results as shown in the bottom browser window 144. For illustrative purposes, assume that information has been stored, where the stored information comprises an alignment of output text with input text. The input text comprises text in a first language (English). The output text comprises text in a second language (Spanish) produced from machine translation performed on the input text.

In the exemplary embodiment shown in FIG. 6, the phrase "What started" 146 has been translated into "Qué comenzó" 148. "What started" 146 corresponds to the input text. "Qué comenzó" 148 corresponds to the output text. The text of the top browser window 142 corresponds to the source text. The text of the bottom window 144 corresponds to the result text.

As shown in FIG. 6, a user has manipulated a cursor 150 to identify the output text 148 by moving the cursor 150 over the output text 148 (that is, the cursor 150 is hovering over the output text 148). In response to this identification, the corresponding aligned input text 146 has been indicated with an indication feature, underlining in this example. As non-limiting examples, the indication feature may comprise one or more of the following: a box around the output text, underlining, double underlining, bold, italics, font, font size, font color, background color, highlighting, strikethrough, small caps, all capital letters, blinking and other animation.

In FIG. 6, while the identified text and the indicated text are both shown with the indication feature (underlining), in other embodiments only the indicated text may be shown with the indication feature. In further embodiments, a different, identification feature may be used for the identified text than the indication feature of the indicated text. While an indication feature (underlining) is employed in the exemplary embodiment of FIG. 5, a specific indication feature need not be used as long as text is identified and other text is indicated in some manner.

With regards to alignment, the storage of source-target pairs has been disclosed in U.S. Pat. No. 6,345,243 to Clark, titled "System, Method, And Product For Dynamically Propagating Translations In A Translation-Memory System."

Figure 7:
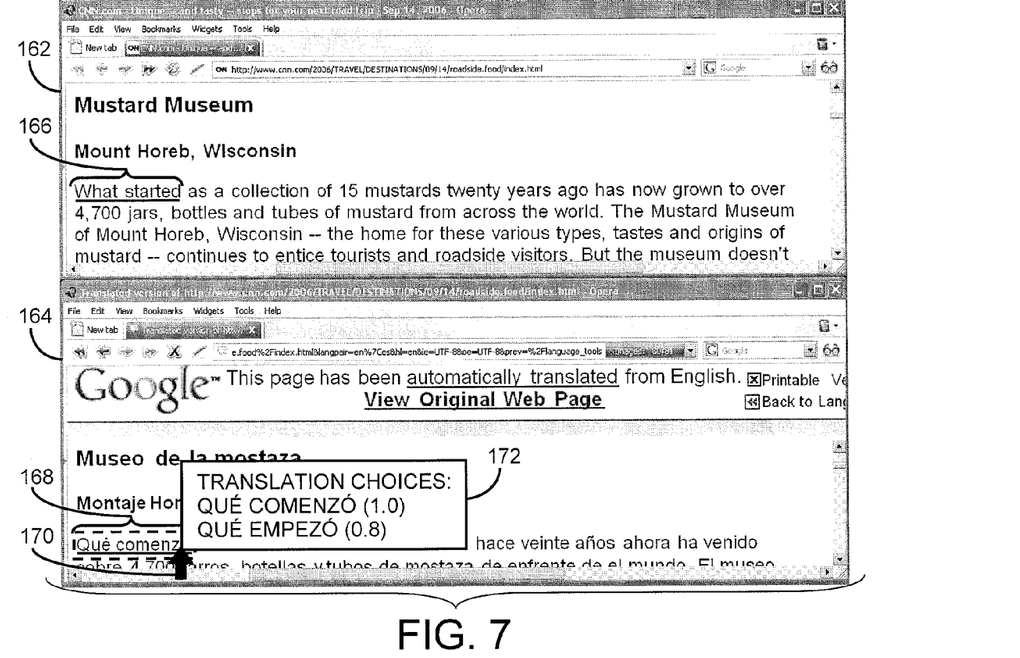
FIGS. 7 and 8 show another exemplary embodiment of the invention incorporating steps 100-106 of the method depicted in FIG. 4 and illustrating additional functionality that may be employed.
Figure 8:
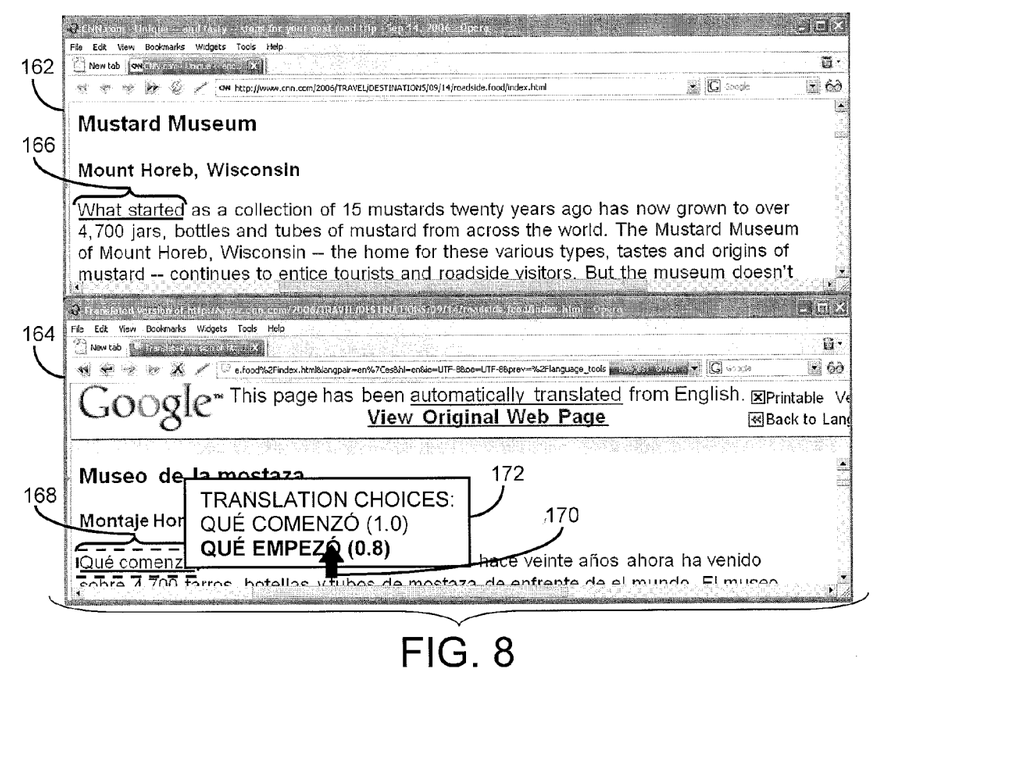

FIGS. 7 and 8 show another exemplary embodiment of the invention incorporating steps 100-106 of the method depicted in FIG. 4. In FIGS. 7 and 8, two web browser windows are open 162, 164 showing the same web page, a CNN® page titled "Unique—and tasty—stops for your next road trip," in two different languages. The page is in English in the top browser window 162. Using machine translation, the text in the web page was translated from English into Spanish, with the results as shown in the bottom browser window 164. For illustrative purposes, assume that first information and second information have been stored. The stored first information comprises an alignment of output text with input text. The input text comprises text in a first language (English). The output text comprises text in a second language (Spanish) produced from machine translation performed on the input text. The stored second information comprises a confidence value corresponding to an indication of reliability of the output text.

Similar to FIGS. 5 and 6 above, in the exemplary embodiment shown in FIGS. 7 and 8, the phrase "What started" 166 has been translated into "Qué comenzó" 168. "What started" 166 corresponds to the input text. "Qué comenzó" 168 corresponds to the output text. The text of the top browser window 162 corresponds to the source text. The text of the bottom window 164 corresponds to the result text. For illustrative purposes, assume that the English phrase "What started" can be determined, by machine translation, to have two potential Spanish translations: "Qué comenzó" and "Qué empezó."

As can be seen in FIGS. 7 and 8, the input text 166 and the output text 168 are both displayed. Furthermore, as in FIG. 5, the display of the output text 168 comprises a display attribute (a dashed box) corresponding to the stored second information. As in FIG. 6, the stored first information has been used such that, in response to a user identifying one of the input text or the output text, the corresponding text in the other of the input text or the output text has been indicated. That is, in FIGS. 7 and 8, a user has manipulated a cursor 170 to identify the output text 168 by moving the cursor 170 over the output text 168 (that is, the cursor 170 is hovering over the output text 168). In response to this identification, the corresponding aligned input text 166 has been indicated with an indication feature, underlining in this example.

FIGS. 7 and 8 further illustrate additional functionality that may be employed in the exemplary embodiments of this invention. In FIG. 7, a user has manipulated the cursor 170 by clicking on the identified output text 168. In reaction thereto, a dialogue or pop-up dialogue 172 has opened. The dialogue 172 shows the user translation choices available for the identified output text 168, namely: "Qué comenzó" and "Qué empezó." The dialogue also shows the confidence value for each translation choice in parentheses after the translation choice. Thus, "Qué comenzó" has a confidence value of 1.0 and "Qué empezó" has a confidence value of 0.8.

FIG. 8 illustrates how the user may select a different translation by clicking on it in the dialogue. After opening the dialogue 172, the user has moved the cursor 170 over a translation choice different from the one initially selected by the machine translation system (the user has moved the cursor 170 over "QUÉ EMPEZÓ"). Should the user wish to use a different translation, the user may select it from the translation choices in the dialogue 172. If the user does select a different translation choice, the initial translation choice, as shown in the display of the output text, will be replaced by the selected translation choice.

In other embodiments, the confidence value for each translation choice may not be shown in the dialogue. In further embodiments, the translation choices may be arranged in a different order rather than one based on the associated confidence value of each translation choice. In other embodiments, the dialogue may not be a pop-up dialogue. In further embodiments, the translation choices may be shown elsewhere in the display and not in a dialogue. In other embodiments, different or additional information may be shown in the dialogue, such as the input text, as a non-limiting example. In further embodiments, the dialogue may enable a user to input their own translation choice to select and use. While shown in relation to the output text, in other embodiments, the dialogue may be opened in response to a user interacting with input text. In further embodiments, the dialogue may not pop-up or be available unless a plurality of translation choices are available for the given output text or input text.

U.S. Pat. No. 4,791,587 to Doi, titled "System For Translation of Sentences From One Language To Another," discloses selectively displaying translation possibilities when a plurality of translation possibilities are present.

Figure 9:
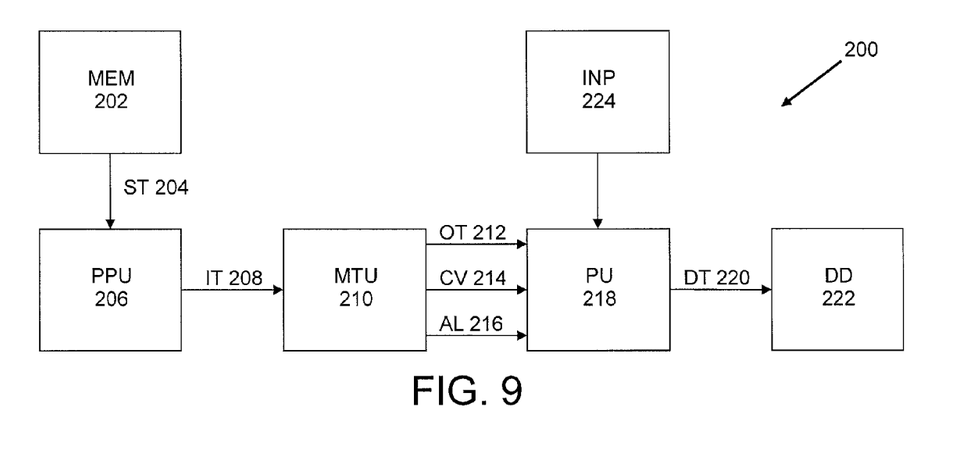
FIG. 9 shows an exemplary block diagram illustrating the potential software and hardware structure for a system implementing an exemplary embodiment of the invention.

FIG. 9 shows an exemplary block diagram illustrating the potential software and hardware structure for a system 200 implementing an exemplary embodiment of the invention. Some elements shown in the system 200 and discussed below in reference thereto are similar to the components discussed above with respect to the exemplary machine translation system 10 shown in FIG. 2. For those elements in the system 200 of FIG. 9 that share a common name with components of the exemplary machine translation system 10 shown in FIG. 2, reference may also be made to the above discussion regarding FIG. 2.

For the purposes of the exemplary block diagram depicted in FIG. 9, assume that a user has already specified a source language and a target language. In the system 200 of FIG. 9, a memory (MEM) 202 stores source text (ST) 204. The ST 204 comprises text in the source language. The MEM 202 is coupled to a pre-processing unit (PPU) 206 and transmits the ST 204 to the PPU 206. The PPU 206 segments the ST 204 into a series of input texts. Each input text (IT) 208 may comprise a word, phrase or sentence of the ST 204, as non limiting examples. A machine translation unit (MTU) 210 is coupled to the PPU 206 and receives each IT 208 as an input. For illustrative purposes, assume that the MTU 210 is capable of translating text from the source language into the target language. The MTU 210, using a library of words and phrases (not shown) and one or more algorithms (not shown), performs machine translation on the IT 208 by searching the library for the best translation of the IT 208, producing output text (OT) 212 as a result. That is, the MTU 210 translates the IT 208 from the source language into the target language to output the OT 212.

The MTU 210, as outputs, produces OT 212, a confidence value (CV) 214 and alignment information (AL) 216. The OT 212 is a translation of the IT 208 in the target language. The CV 214 corresponds to an indication of reliability of the OT 212. The AL 216 is indicative of an alignment of the IT 208 with the OT 212. The MTU 210 is coupled to a processing unit (PU) 218. The three outputs of the MTU 210, that is, the OT 212, the CV 214 and the AL 216, are received as inputs by the PU 218. The PU 218 performs various operations on its respective inputs to produce display text (DT) 220 as an output. The PU 218 is coupled to an input device (INP) 224 and a display device (DD) 222. The DD 222 is operable to display the DT 220. The DT 220 comprises the OT 212 and the IT 208. The display of the DT 220 on the DD 222 comprises a display attribute corresponding to the CV 214 of the OT 212. The display attribute comprises any visual attribute of or connected to the display of the DT 220. As non-limiting examples, the display attribute may comprise one or more of the following: a box around a relevant portion of the DT 220, underlining, double underlining, bold, italics, font, font size, font color, background color, highlighting, strikethrough, small caps, all capital letters, blinking and other animation.

The INP 224 is operable to transmit information corresponding to a user operating the INP 224. In response to a user operating the INP 224 to identify one of the IT 208 or the OT 212, the PU 218 produces DT 220 comprising an indication feature, wherein the indication feature indicates corresponding text in the other of the IT 208 or the OT 212 based on the AL 216.

In other embodiments, the system 200 may not comprise the AL 216 and the INP 224 and the DT 220 may not comprise the IT 208. See the discussion of FIG. 5 above for more detail concerning this embodiment. In further embodiments, the system 200 may not comprise the CV 214 and the DT 220 may not comprise the display attribute. See the discussion of FIG. 6 above for more detail concerning this embodiment.

In another embodiment, the DT 220 comprises a plurality of output texts and a plurality of display attributes, with the plurality of display attributes corresponding to a plurality of confidence values. In a further embodiment, the outputs of the MTU 210 comprise a plurality of translation choices for the IT 208 and, in response to a user operating the INP 224, the DT 220 produced by the PU 218 comprises the plurality of translation choices. In another embodiment, the CV 214 for more than one OT 212 may be indicated, by one or more display attributes, in the DT 220.

One or more of the PPU 206, the MTU 210 and the PU 218 may comprise additional memory units for the storage of information and/or data. Furthermore, additional pathways not shown in FIG. 9 may be present, coupling various elements with one another. As a non-limiting example, a separate pathway may couple the PU 218 with the PPU 206. While shown in FIG. 9 as separate elements, one or more of the individual elements of FIG. 9 may be located in the same device, circuit or component, as non-limiting examples. For example, a singular integrated circuit may implement the functions designated for and performed by the PPU 206, the MTU 210 and the PU 218. In addition, the functions performed by two or more of the individual elements of FIG. 9 may instead be performed by a single component. As a non-limiting example, the same data processor may implement the functions associated with the PPU 206 and the MTU 210.

Generally, various exemplary embodiments of the invention can be implemented in different mediums, such as software, hardware, logic, special purpose circuits or any combination thereof. As a non-limiting example, some aspects may be implemented in software which may be run on a computing device, while other aspects may be implemented in hardware.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:
    storing, on a storage device, input text, output text, alignment information and a confidence value, wherein the alignment information is indicative of an alignment of the output text with the input text, wherein the input text comprises text in a first language, wherein the output text comprises text in a second language produced from machine translation performed on the input text, wherein the confidence value corresponds to an indication of reliability of the output text;
    displaying, on a display, the input text, the output text and a display attribute corresponding to the confidence value; and
    indicating on the display, using the alignment information, in response to a user identifying a portion of one of the input text or the output text, the corresponding text in the other of the input text or the output text.

2. The method of claim 1, wherein a plurality of output texts are displayed, wherein a plurality of display attributes are used, wherein the plurality of display attributes correspond to a plurality of confidence values for the plurality of output texts.

3. The method of claim 1, wherein at least a portion of the output text has a plurality of translation choices, the method further comprising displaying, in response to a user action, the plurality of translation choices.

4. The method of claim 1, wherein the display attribute comprises highlighting.

5. A system comprising:
    a machine translation unit operable to receive input text in a first language, to perform machine translation on the input text and to produce outputs comprising output text in a second language and a confidence value, wherein the confidence value corresponds to an indication of reliability of the output text, wherein the outputs of the machine translation unit further comprise alignment information indicative of an alignment of the output text with the input text;
    a processing unit coupled to the machine translation unit and operable to receive the input text, the output text and the confidence value and to produce first display text to be displayed on a display device, wherein the first display text comprises the output text, the input text and a display attribute corresponding to the confidence value;
    an input device coupled to the processing unit and operable to transmit information corresponding to a user operating the input device; and
    a display device coupled to the processing unit and operable to display the first display text, wherein, in response to a user operating the input device to identify a portion of one of the input text or the output text, the processing unit is operable to produce second display text comprising an indication feature, wherein the indication feature indicates corresponding text in the other of the input text or the output text based on the alignment information, where the display device is operable to display the second display text.

6. The system of claim 5, wherein the display text comprises a plurality of output texts, wherein the display text comprises a plurality of display attributes, wherein the plurality of display attributes correspond to a plurality of confidence values for the plurality of output texts.

7. The system of claim 5, wherein the outputs of the machine translation unit further comprise a plurality of translation choices for at least a portion of the output text, wherein, in response to a user operating the input device, the processing unit produces third display text comprising the plurality of translation choices, where the display device is operable to display the third display text.

8. The system of claim 5, wherein the display attribute comprises highlighting.

9. A computer-readable storage medium storing program instructions, execution of the program instructions resulting in operations comprising:
    storing input text, output text, alignment information and a confidence value, wherein the alignment information is indicative of an alignment of the output text with the input text, wherein the input text comprises text in a first language, wherein the output text comprises text in a second language produced from machine translation performed on the input text, wherein the confidence value corresponds to an indication of reliability of the output text;
    displaying the input text, the output text and a first display attribute corresponding to the confidence value; and
    indicating, using the alignment information, in response to a user identifying a portion of one of the input text or the output text, the corresponding text in the other of the input text or the output text.

10. The computer-readable storage medium of claim 9, wherein at least a portion of the output text has a plurality of translation choices, execution of the program instructions resulting in operations further comprising displaying, in response to a user action, the plurality of translation choices.

11. The computer-readable storage medium of claim 9, wherein indicating is performed in response to the user identifying the portion of one of the input text or the output text by moving a cursor over the portion of one of the input text or the output text.

12. The computer-readable storage medium of claim 9, wherein indicating the corresponding text comprises using a second display attribute.

13. The computer-readable storage medium of claim 12, wherein the second display attribute comprises highlighting.

14. The computer-readable storage medium of claim 12, wherein the second display attribute comprises at least one of a box, underlining, double underlining, bold, italics, font, font size, font color, background color, strikethrough, small caps, all capital letters, blinking and other animation.

15. The computer-readable storage medium of claim 9, wherein the portion of one of the input text or the output text is identified using a third display attribute, wherein the corresponding text in the other of the input text or the output text is identified using a fourth display attribute, wherein the third display attribute is different from the fourth display attribute.

16. The computer-readable storage medium of claim 9, wherein the first display attribute comprises a font color.

17. The computer-readable storage medium of claim 9, wherein the first display attribute comprises at least one of a box, underlining, double underlining, bold, italics, font, font size, background color, strikethrough, small caps, all capital letters, blinking and other animation.

* * * * *